United States Patent [19]

Bauman

[11] 4,356,780
[45] Nov. 2, 1982

[54] EQUALIZED FURROW FORMING APPARATUS FOR A SEED PLANTER
[75] Inventor: Jack L. Bauman, Naperville, Ill.
[73] Assignee: International Harvester Co., Chicago, Ill.
[21] Appl. No.: 153,975
[22] Filed: May 28, 1980
[51] Int. Cl.³ .......................... A01C 5/06; A01C 7/20
[52] U.S. Cl. ...................................... 111/85; 111/88; 172/239; 172/395; 172/421
[58] Field of Search ....................... 111/87, 88, 85, 86; 172/395, 239, 421

[56] References Cited

U.S. PATENT DOCUMENTS

| 2,191,929 | 2/1940 | Strandlund | 172/395 |
| 2,685,243 | 8/1954 | Cole | 111/88 X |
| 4,009,668 | 3/1977 | Brass et al. | 111/88 X |

FOREIGN PATENT DOCUMENTS

| 247550 | 3/1963 | Australia | 172/239 |
| 1261393 | 4/1961 | France | 172/421 |
| 2415421 | 8/1979 | France | 111/88 |

OTHER PUBLICATIONS

5100 Seed Boss Planter White Farm Equipment Brochure, No. 5-258.

Primary Examiner—Steven A. Bratlie
Attorney, Agent, or Firm—J. J. Getchius; F. D. Au Buchon

[57] ABSTRACT

An apparatus to be towed that includes a frame supported, rotatably mounted, pair of furrow forming disks that are arranged to substantially contact each other at the approximate point of entry into the soil and diverge apart rearwardly and upwardly, a pair of rotatable gauge wheels having supports that individually and pivotally connect the wheels to the frame to regulate furrow depth, with each wheel being located generally adjacent an outer surface of a disk, and an equalizer assembly connecting the supports so that movement of a gauge wheel by an obstacle upward produces an equal movement of the other gauge wheel downward to produce a frame height and hence related furrow depth that is the average between the gauge wheel elevations.

2 Claims, 7 Drawing Figures

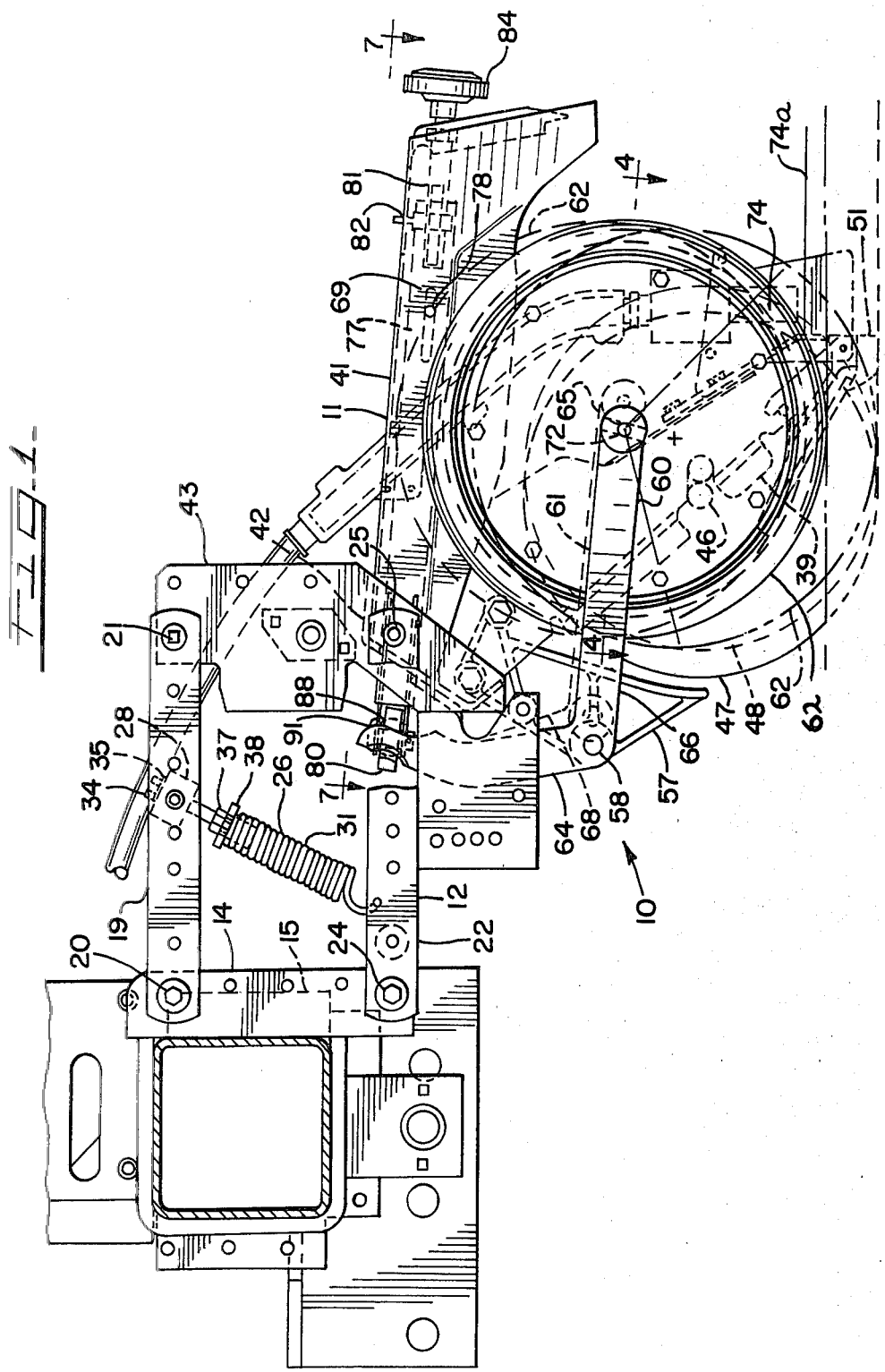

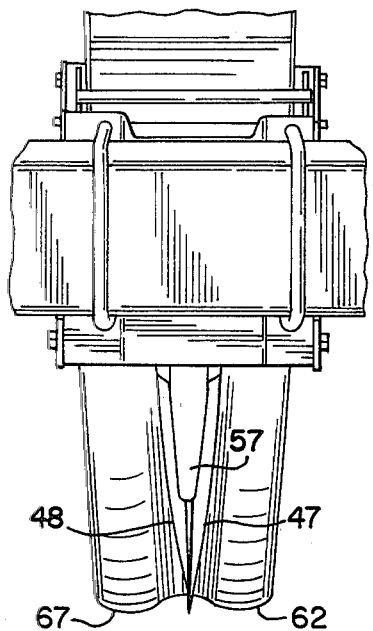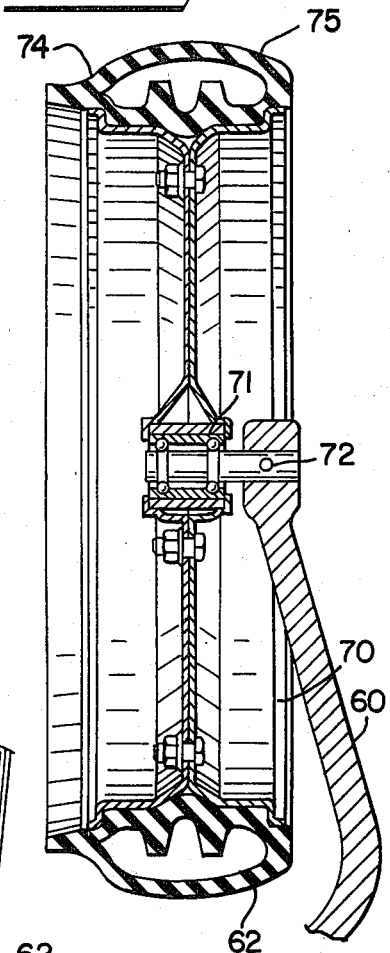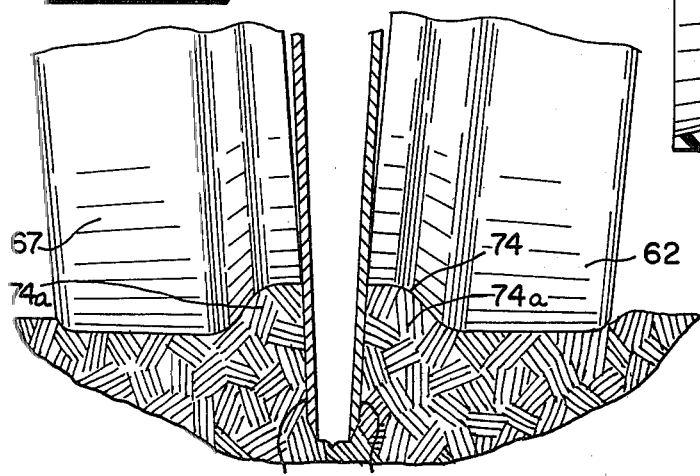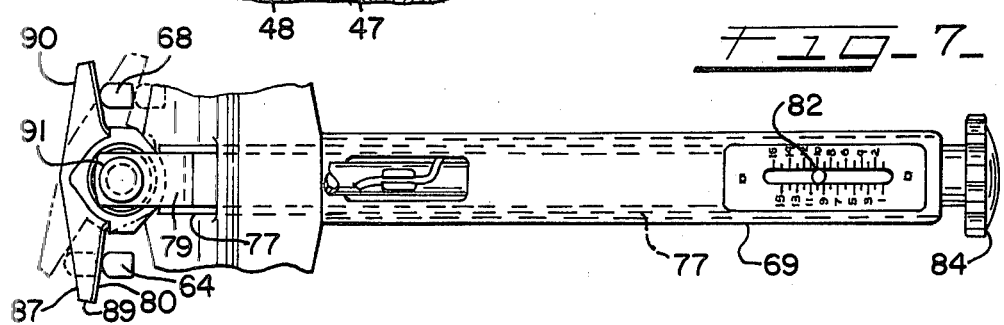

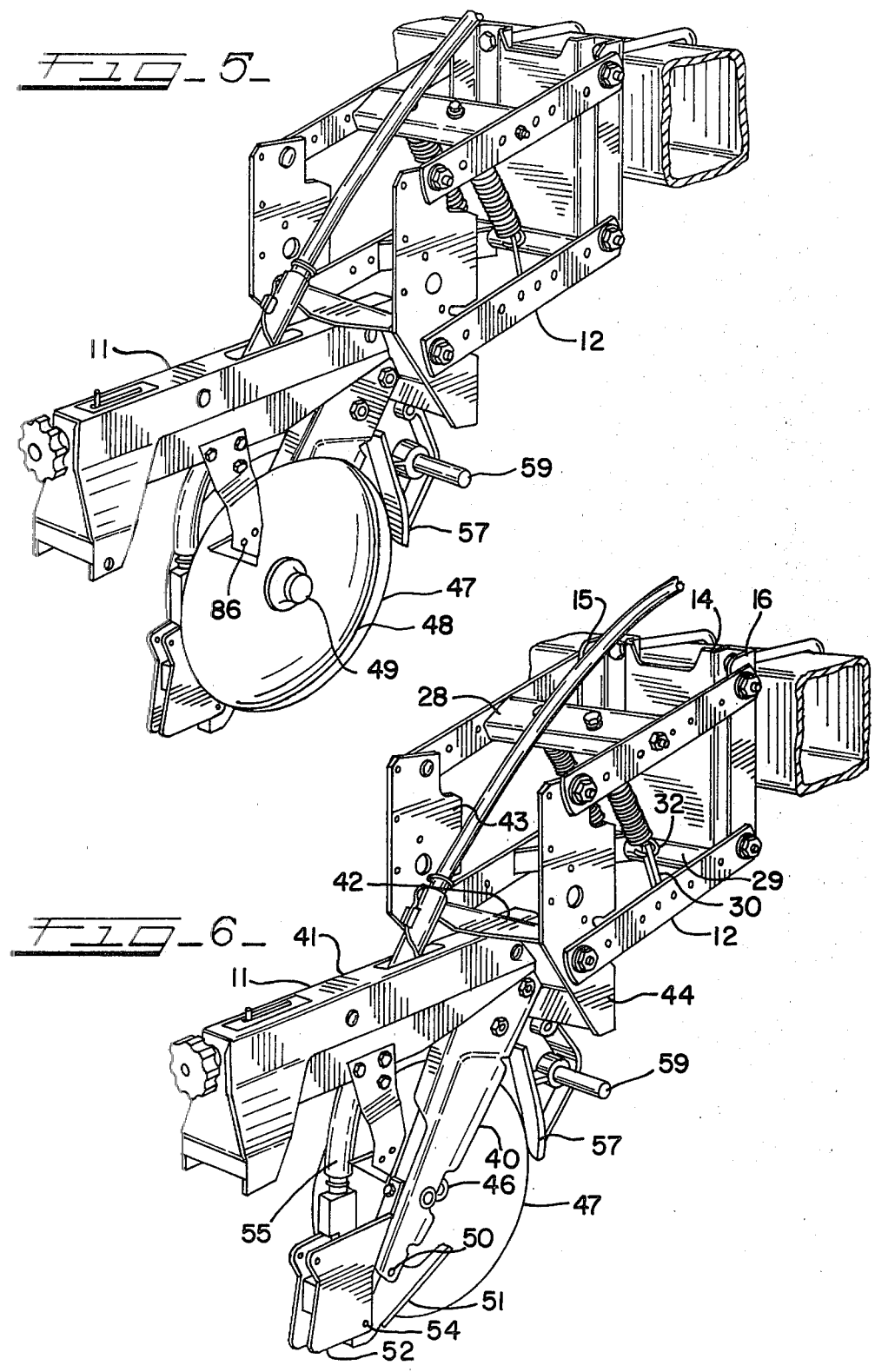

EQUALIZED FURROW FORMING APPARATUS FOR A SEED PLANTER

FIELD OF THE INVENTION

This invention pertains generally to agricultural planting equipment.

DESCRIPTION OF THE PRIOR ART

The efficient production of crops requires that seed planters meet certain primary design objectives which are: creating a furrow having an accurate planting depth and preferably providing soil having a reasonably high moisture content for early germination, accurate seed spacing and seed to soil contact. This invention is primarily concerned with the furrow forming aspect of the planter.

A known seed planter utilizes a conventional pair of rotatably mounted, generally flat, disk openers that substantially contact each other where the disks enter the ground and diverge apart rearwardly and upwardly. The disks are supported on a frame which is connected to a tool bar by a parallel bar linkage so that the frame is maintained in a generally horizontal position parallel to the ground despite varying ground contours. A pair of rotatable gauge wheels are individually pivotally supported on the frame rearward of the disks with their wheel axes also being located rearwardly of the disk axes. Each wheel laterally closely approaches its associated disk and may scrape the disk where same exits the soil to compact the soil to form a generally V-shaped furrow with flat upper surfaces. It also gauges at this position. This structure provides a furrow of accurate and adjustable depth although with somewhat undesirable furrow characteristics. A problem occurs when one of the gauge wheels encounters an obstruction and the other does not. The one wheel merely rides over the obstruction, lifting the frame and hence disks upward. If the obstruction is the height of the planting depth, the seed is merely deposited on the ground with no furrow provided and thus with little chance of germination. The other wheel merely drops down to the soil level but does not support the frame. Hence, in this condition, accurate furrow depth is not provided. Flotation is also decreased as only one wheel is gauging and supporting the frame. Where the wheels are somewhat laterally spaced from the disks on the frame, tilting of the disks and frame can also occur which affects planting depth accuracy.

SUMMARY OF THE INVENTION

Applicant, as a consequence, designed an apparatus that substantially minimizes the problems of the prior art. Although the equalizing arrangement is shown incorporated into a furrow forming apparatus that provides improved furrow characteristics not found in the prior art planter described, the equalizer concept will also work with the prior art planter and related planters.

The equalizer, when a wheel encounters an obstacle and rises, forces downwardly the other wheel a like amount with the other wheel continuing to contact the soil it was riding upon. Thus both wheels support the frame, and the frame rises the average distance between the two elevations, or half of the distance of the obstacle height and not all of it, so seed will still fall into a furrow and germinate.

Also, specifically, applicant preferably desires a non-positive equalizing system wherein the individually mounted wheels are not tied together under all conditions that is, when one wheel moves up, the other wheel moves down and vice versa. In applicant's design, the wheel moving down will continue to fall to a lower position than the increase in height of the wheel forced up (since the wheels are not tied together) if operating outside of the equalizing range. This always provides a soft mound of soil alongside the seed furrow since the lower wheel contacts the soil in the same manner as the higher wheel thus trapping the soil. Further, when the tool bar is lifted, both wheels can fall downwardly to remove soil or trash trapped between the wheels and disks. Also, applicant prefers a front pivotal mounting for each gauge wheel that is forward of the respective disk whose wheel axis is always rearward of its disk, and as a consequence a long arm between the gauge wheel and its pivot. Thus, rather large wheel movements will produce a small angle of rotation about the arm front pivot and since the upper arm portion is also quite short, this small angle imported thereto presents a small travel distance for the centrally pivoted equalizer bar that is connected to the gauge wheel height adjustment and contacts the upper arm portions. Thus, small equalizer corrections are made instead of frequent and large corrections where the equalizer is connected with short arms from the rear of the disks pivot to the gauge wheel. Thus applicant's device operates smoother and should encounter fewer maintenance problems.

It is, therefore, an object of this invention to provide a new and improved equalized furrow forming apparatus for a planter.

Another object is to provide an apparatus that has a non-positive operation.

Another object is to provide an apparatus that reduces the frequency and severity of the equalizing action.

BRIEF DESCRIPTION OF THE DRAWINGS

FIG. 1 is a side elevational view of the apparatus of this invention;

FIG. 2 is a view looking rearward before the tool bar showing the apparatus set at zero furrow depth;

FIG. 3 is essentially a schematic view immediately before the gauge wheel bearings looking rearward showing the furrow walls and mounds formed along the furrow;

FIG. 4 is a sectional view of a gauge wheel and support arm taken along 4—4 of FIG. 1;

FIG. 5 is a perspective right side view primarily of the right disk and scraper with the associated gauge wheel of the apparatus removed;

FIG. 6 is a view similar to FIG. 5 but with the right disk removed; and

FIG. 7 is a partial plan view of the apparatus taken along 7—7 of FIG. 1 showing the equalizer and the gauge wheel adjustment.

DESCRIPTION OF THE PREFERRED EMBODIMENT

Referring to FIGS. 1, 2, 5, 6, and 7, 10 indicates an equalized furrow forming apparatus for a seed planter. Apparatus 10 has a frame 11. Apparatus 10 includes a mounting means 12 for attachment to a mobile power source such as a tractor or tool bar for towing. Mounting means 12 includes a head bracket 14 having lateral flanges 15 and 16. Bracket 14 has suitable holes for connection thereto to the tool bar by U-bolts and nuts.

Dual spaced upper links 19 are pivotally connected to the upper part of flanges 15 and 16 at pivots 20 by suitable fasteners and are similarly connected to frame 11 at 21. Dual, spaced lower links 22 are similarly connected between the noted flanges at pivots 24 and the frame at 25. The conventional parallel linkage arrangement described allows the apparatus to follow the ground contour in operation.

Where the apparatus does not have sufficient weight to create the furrow, dual biasing means 26 are provided. Each means 26 extends between channel 28 attached between upper links 19 and support structure which includes tube 29 rigidly connected between links 22 and braces 30 extending between tube 29 (see FIG. 6) and each link 22. Means 26 includes spring 31 having a hook end 32 which connects with a suitable aperture in brace 30. Bolt 34, top washer 35 and lock nut 37 along with internally threaded plug 38 which is threaded inside spring 31, connect the spring 31 to the top channel 28. It can be seen that spring adjustment can be provided by loosening lock nut 37 and rotating bolt 34 clockwise which will cause the plug 38 to move thereto, thereby extending spring 31. Due to the connection of spring 31 to the upper links 19 remote from pivot 20, compared to the hook end 32 of spring 31 which is located close to pivot 24, the parallel linkage is spring loaded downward to increase the force applied to later to be described opener disks to insure that they penetrate the soil. Moving top channel 28 to other holes shown in top links 19 will provide further adjustment.

Frame 11 is a weldment that provides the necessary structure for all elements of the apparatus. As shown best in FIGS. 1 and 6, frame 11 consists of left 39 and right hand 40 lower sheets that provide the support for the later to be described disks, compaction runner, seed shoe, gauge wheels and equalizer. Frame 11 also includes upper channel 41 which is welded to the sheets and which houses the gauge wheel adjustment and spreader plate 42 which primarily provides support for left and right hand plates 43 and 44 on which are mounted pivots 21 and 25 of the parallel bar linkage. Suitable structure in the plates provide stops as desired for the parallel linkage.

Referring also to FIG. 6, support 46 is welded into sheets 39 and 40 and supports furrow forming disks 47 and 48. Preferably the axes of the fourteen inch diameter disks are staggered longitudinally by one inch with left disk 47 forward and the axes inclined so that the included angle is 9.5 degrees and the disks substantially contact each other at a point forward of their axes at about 38 degrees downwardly from the horizontal. As shown in FIG. 5, flange type bearings 49 are utilized which are rotatably connected to support 46 welded to frame 11 by bolts threaded therein.

Located below support 46 is pin 50 which loosely supports compaction runner 51. Runner 51 also has a lower V-shaped configuration that extends slightly below the disks to provide the desired firmed furrow configuration. Runner 51 is also supported on rearward deflector or shoe 52 via pin 54 with shoe 52 being attached to sheets 39 and 40 by suitable cap screws shown. Shoe 52 is also spaced for seed tube 55 which extends therebetween to drop seed rearward of the V-shaped portion of the runner 51 into a furrow. Shoe 52 also prevents the movement of loose soil back into the furrow until the seed has been deposited.

Located forwardly of support 46 and connected between sheets 39 and 40 by suitable fasteners is gauge wheel mounting 57. Mounting 57 has pins 58 and 59 which are staggered longitudinally by one inch as the disks, with pin 58 forward and the pins are threaded into the mounting on axes parallel to the disk axes. As shown best in FIG. 1, mounted on pin 58 is left hand arm or support 60. Arm 60 has a rearwardly extending portion 61 that is connected to gauge wheel assembly 62 and a forwardly extending portion 64. Right hand arm of support 65 is similar to 60, and has rearward portion 66 for gauge wheel assembly 67 (not shown in FIG. 1) but because of the staggered mounting, has a longer forward upper portion 68 than 64 since they are transversely aligned to contact gauge wheel depth adjustment mechanism 69.

Gauge wheel assembly 62 (see FIG. 4) is typical for both arms 60 and 65 and includes wheel 70 made from composite elements connected by suitable fasteners. Each arm 60 (and 65) is connected to a roller bearing 71 with integral shaft by pin 72. It is to be noted that the bore for bearing 71 in arm 60 is inclined laterally outwardly and downwardly by about 2.50° from the associated disk, as shown in FIG. 3, so that radially inward peripheral lip 74 of semi-pneumatic tire 75 will substantially contact its disk at an arc of about 8:30 to 4:30 throughout its travel as shown in broken lines in FIG. 1 and create uncompacted mound 74a of loose soil alongside the furrow wall. This arc extends beyond the point of entry of the disk into the soil and its exit and helps prevent the flow of trash between wheel and disk. Primarily it provides a mound of uncompacted soil for deposition into a furrow to provide uniform cover for the seed regardless of soil type in conjunction with the other gauge wheel. The flexing of tire 75 helps prevent caking of soil thereon.

Gauge wheel adjustment mechanism 69 is shown best in FIGS. 1 and 7. Adjusting mechanism 69 is located in upper channel 41 of frame 11 and is readily accessible from the end of the apparatus remote from the tool bar. Mechanism 69 includes hollow slide 77 located in channel 41 and supported for movement on pins 78 (one shown) extending through channel 41 and slots in slide 77. Slide 77 also has a clevis end 79 rigid therewith and extending through a suitable opening through spreader plate 42 and has equalizer assembly 80 extending transversely therethrough. Equalizer assembly 80 extends between the ends of 64 of arm 60 and 68 of arm 65 and forward thereof. Therefore rearward movement of slide 77 will force arms 60 and 65 rearwardly causing the associated wheel assemblies to move toward the soil thereby lifting frame 11 and thus raising the disk to create a shallow furrow. Contrary movement will provide a deeper furrow. The movement of slide 77 is caused by a depth adjustment rod 81 having a right hand thread at its rearmost end that is engageable with a complementary internal thread in the rearward end of the slide 77. Indicator 82 is mounted on slide 77 on rod 81. Attached to the end of rod 81 is knob 84. Rotation of knob 84 clockwise will move indicator 82 and slide 77 rearward thus lowering the gauge wheels to create a shallow furrow. The indicator will also move to the zero gauge position shown in FIG. 2. Turning counterclockwise will produce a counter result. As shown, the indicator indicates an approximate two inch planting depth. Suitable detent means can be provided to maintain knob 84 in the set position.

Scrapers such as right hand scraper 86 (see FIG. 5) which extends from frame 11 and is located outside the 8:30 to 4:30 position noted of the contact of the gauge wheel and the disk, will remove soil that sticks to the disk as it leaves the furrow. Normally, this soil falls back alongside the furrow or inside the gauge rim where it moves out as water over a dam. However, when the tool bar is raised, and since each arm 60 and 65 can drop away from equalizer assembly 80 this allows the accumulated scraped soil to drop out from this area aiding in cleaning the apparatus.

Referring to FIG. 1, the gauge wheels are shown in broken lines at the same elevation of the disks at the zero furrow position. FIG. 2 discloses the substantial meeting of the preferably staggered disks and the gauge wheels in the zero position. The solid line position of the gauge wheels in FIG. 1 discloses a two inch planting furrow, while the upper broken line position shows the approximate highest elevation of the gauge wheels which provides approximately a four inch furrow depth. Also to be noted from FIG. 1 is that gauging occurs (with little change) between the maximum depth of the disks (and laterally adjacent the disks) and where the disks exit the soil. The compaction runner provides a consistent, V-shaped firmed furrow bottom while the deflector or shoe prevents soil inflow into the furrow and provides support for the seed tube.

FIG. 3 discloses the gauged furrow and the mounds 74a of moist uncompacted soil for later deposition into the furrow after the seed during the planting process.

Referring to FIGS. 1 and 7, equalizer assembly 80 is shown in detail. Assembly 80 includes bar 87 having spherical bearing 88 mounted in spherical opening in the center of bar 87 for movement therein. Bar 87 has left arm 89 adjacent but forward of arm 64 and arm 90 adjacent and forward of arm 68. Pin 91 extends between suitable holes in clevis 79 secured to slide 77 and via a fastener rigidly holds spherical bearing 88 therebetween. Therefore, pivotal movement of bar 87 causes rotation thereof about spherical bearing 88. As noted in FIG. 1, as arms 64 and 68 move on their arcs and contact arms 89 and 90 of bar 87 the spherical bearing 88 also accommodates the movement of bar 87 thereon so the arms 89 and 90 will follow the gauge wheel arms in the most efficient manner. Also to be noted is that the equalizer assembly works with adjusting mechanism 69 for manual furrow depth changes. The equalizer action insures that the gauge wheels carry equal weight. FIG. 7, in broken lines, shows the position taken by equalizer bar 87 when left gauge wheel assembly 62 encounters an obstacle and arm 64 moves 89 of bar 87 forward as shown. Arm 90 is then forced rearwardly to move arm 68 also rearwardly and thus right gauge wheel assembly 67 downwardly. As mentioned, if gauge wheel 67 is on the soil as before, it and wheel assembly 62 will both support the frame with the frame only rising ½ of the height of the obstacle.

Also while an equalizing range of one half maximum planting depth is preferable, if this is exceeded wheel 67 will drop to the soil and continue to provide a mound of uncompacted soil alongside the furrow.

It is felt that the entire operation of the apparatus is readily apparent from the description noted above. The apparatus clearly provides accurately gauged furrow depth wherein gauging is accomplished laterally close to the disks and longitudinally close to the maximum depth achieved by the disks while maintaining desirable furrow characteristics. The equalizing feature also contributes substantially to the accuracy of the furrow depth when obstacles are encountered which are relatively frequent in no-till situations for which applicants have provided the described, staggered disk mounting arrangements. The equalizing feature also contributes substantially to the accuracy of the furrow depth when operating alongside ridges thrown up by tractor tires or when crossing water furrows or tire tracks.

What is claimed is:

1. A furrow forming apparatus for a seed planter comprising:
    (a) a frame, said frame being adapted to be attached for towing to a mobile power source;
    (b) a pair of opposed, furrow forming disks rotatably mounted on said frame with the disks substantially contacting each other at the approximate point of entry into the soil and diverging apart rearwardly and upwardly to the direction of travel;
    (c) a pair of gauge wheel means individually mounted on said frame forward of said disks for regulating furrow depth, each means comprising: a support pivotally mounted on said frame, a wheel located generally adjacent an outer surface of a disk and rotatably mounted on said support on an axis rearward of the disk axis of rotation; and
    (d) equalizing means, pivotally mounted on said frame and extending between and positioned forward and adjacent said supports, whereby movement of a support and thus wheel in one direction produces the same movement of the other support and wheel in a contrary direction and where the lower wheel will fall to the soil and the movement of its support will be away from the equalizing means when out of the equalizing range.

2. The apparatus of claim 1 in which each support has a portion extending above the pivotal mounting of said support on the frame for contact with said equalizing means and said portion is shorter than the distance between the pivotal mounting and said wheel axis.

* * * * *